United States Patent
Blaffert et al.

(10) Patent No.: US 8,526,697 B2
(45) Date of Patent: Sep. 3, 2013

(54) APPARATUS FOR SEGMENTING AN OBJECT COMPRISING SUB-OBJECTS

(75) Inventors: Thomas Blaffert, Hamburg (DE); Hans Barschdorf, Dassendorf (DE); Jens Von Berg, Hamburg (DE); Sebastian Peter Michael Dries, Hamburg (DE); Cristian Lorenz, Hamburg (DE); Rafael Wiemker, Kisdorf (DE); Tobias Klinder, Uelzen (DE); Astrid Ruth Franz, Hamburg (DE); Steffen Renisch, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 486 days.

(21) Appl. No.: 12/867,522

(22) PCT Filed: Feb. 6, 2009

(86) PCT No.: PCT/IB2009/050495
§ 371 (c)(1),
(2), (4) Date: Nov. 12, 2010

(87) PCT Pub. No.: WO2009/101560
PCT Pub. Date: Aug. 20, 2009

(65) Prior Publication Data
US 2011/0052018 A1    Mar. 3, 2011

(30) Foreign Application Priority Data

Feb. 15, 2008 (EP) .................................. 08151510

(51) Int. Cl.
*G06K 9/00* (2006.01)
(52) U.S. Cl.
USPC .......................................... 382/131; 382/173

(58) Field of Classification Search
None
See application file for complete search history.

(56) References Cited

U.S. PATENT DOCUMENTS

| | | | |
|---|---|---|---|
| 7,010,164 B2 | 3/2006 | Weese et al. | |
| 2005/0196024 A1* | 9/2005 | Kuhnigk | 382/128 |
| 2006/0239522 A1* | 10/2006 | Ferrant et al. | 382/128 |
| 2007/0133894 A1* | 6/2007 | Kiraly et al. | 382/260 |
| 2008/0069421 A1* | 3/2008 | Abramov et al. | 382/132 |
| 2009/0087072 A1* | 4/2009 | Hong et al. | 382/132 |
| 2009/0185731 A1* | 7/2009 | Ray et al. | 382/131 |
| 2012/0027278 A1* | 2/2012 | Chaney et al. | 382/131 |

FOREIGN PATENT DOCUMENTS

| | | |
|---|---|---|
| EP | 1447772 A1 | 8/2004 |
| WO | 2004047030 A2 | 6/2004 |
| WO | 2007065221 A1 | 6/2007 |

OTHER PUBLICATIONS

Blaffert et al. (2008) "Lung lobe modeling and segmentation with individualized surface meshes." Proc. SPIE vol. 6914, pp. 1-10.*
Kuhnigk et al. (2003) "Lung lobe segmentation by anatomy-guided 3D watershed transform." Proc. SPIE vol. 5032, pp. 1482-1490.*

(Continued)

*Primary Examiner* — Barry Drennan

(57) ABSTRACT

The present invention relates to an apparatus (1) for segmenting an object comprising sub-objects shown in an object image. The apparatus comprises a feature image generation unit (2) for generating a feature image showing features related to intermediate regions between the sub-objects and a segmentation unit (3) for segmenting the sub-objects by using the object image and the feature image. Preferentially, the feature image generation unit (2) is adapted for generating a feature image from the object image. In a further embodiment, the feature image generation unit (2) comprises a feature enhancing unit for enhancing features related to intermediate regions between the sub-objects in the object image.

11 Claims, 11 Drawing Sheets

(56) References Cited

OTHER PUBLICATIONS von Berg et al. (2005) "Multi-surface cardiac modeling, segmentation, and tracking." LNCS 3504, pp. 1-11.*

Zhang et al: "Atlas Driven Lung Lobe Segmentation in Volumetric X-Ray CT Images"; IEEE Transactions on Medical Imaging, vol. 25, No. 1, Jan. 2006, pp. 1-19.

Wiemker et al: "Unsupervised Extraction of the Pulmonary Interlobar Fissures From High Resolution Thoracic CT Data"; International Congress Series, vol. 1281, May 2005, pp. 1121-1126.

Frangi et al: "Automatic Construction of Multiple-Object Three Dimensional Statistical Shape Models: Application to Cardiac Modeling"; IEEE Transactions on Medical Imaging, vol. 21, No. 9, Sep. 2002, pp. 1151-1166.

Wang et al: "Pulmonary Fissure Segmentation on CT"; Medical Image Analysis, vol. 10, 2006, pp. 530-547.

Ukil et al: "Automatic Segmentation of Pulmonary Fissures in X-Ray CT Images Using Anatomic Guidance"; Proceedings of Medical Imaging, Feb. 2006, Proceedings of SPIE, vol. 6144, pp. 61440N-1-61440N-11.

Lorenz et al: "A Comprehensive Shape Model of the Heart"; Medical Image Analysis, vol. 10, 2006, pp. 657-670.

Ecabert et al: "Towards Automatic Full Heart Segmentation in Computed-Tomography Images"; Computers in Cardiology, 2005, vol. 32, pp. 223-226.

Klinder et al: "Automated Model-Based Rib Cage Segmentation and Labeling in CT Images"; Miccai 2007, Part II, LNCS 4792, pp. 195-202, 2007.

Haussecker et al: "Tensor-Based Image Sequence Processing Techniques for the Study of Dynamical Processes"; International Symposium on Realtime Imaging and Dynamic Analysis, 1998, 8 Page Document.

Klinder, T.: "Geometrical Rib-Cage Modelling, Detection, Segmentation"; Cars 2007, 4 Page Document.

Jahne: "Neighborhood Operators"; Chapter 9 of the Book, "Computer Vision and Applications: A Guide for Students and Practitioners", Editors Bernd Jahne and Horst Haubecker, Academic Press, 2000, Pages Cited, 334-343.

* cited by examiner

APPARATUS FOR SEGMENTING AN OBJECT COMPRISING SUB-OBJECTS

FIELD OF THE INVENTION

The present invention relates to an apparatus, a method and a computer program for segmenting an object comprising sub-objects. The invention relates further to a model of an object comprising sub-objects.

BACKGROUND OF THE INVENTION

EP 1 447 772 A1 discloses a method of segmenting a lung comprising lung lobes in a three-dimensional image data set. An interactive watershed algorithm uses a cost function that incorporates a distance map calculated from a segmented vessel tree. An increasing distance means absence of vessels, which implies indirectly a boundary between lobes. A growing watershed region fills the regions between boundaries for segmenting the lung lobes.

SUMMARY OF THE INVENTION

Since the method disclosed in EP 1 447 772 A1 uses the absence of vessels for segmenting, and since the absence of vessels in general does not coincide with the border of a lung lobe, and since the location of the absence of vessels depends on several parameters, like the visibility of the vessels and the quality of the vessels' segmentation, the quality of the segmentation of the lung comprising lung lobes is diminished.

It is an object of the present invention to provide an apparatus, a method and a computer program for segmenting an object comprising sub-objects, which improve the quality of the segmentation of an object comprising sub-objects.

In an aspect of the present invention an apparatus for segmenting an object comprising sub-objects shown in an object image is provided, wherein the apparatus comprises:

a feature image generation unit for generating a feature image showing features related to intermediate regions between the sub-objects, a segmentation unit for segmenting the sub-objects by using the object image and the feature image.

The invention is based on the idea that the segmentation is improved when a feature image showing features related to intermediate regions between the sub-objects of the object is generated and used for object segmentation together with the object image. Since the feature image comprises information about the position of the intermediate regions between the sub-objects and since this information is used by the segmentation unit in addition to the object image, the segmentation of the object, in particular, of the sub-objects within the object, is improved.

The features, which are shown in the feature image and which are related to intermediate regions between the sub-objects, are retrieved from features of the object, for example, surfaces of the sub-objects and/or a space or elements between the sub-objects. If, for example, the object, which has to be segmented, is a lung comprising lung lobes, which can be regarded as the sub-objects, the features related to intermediate regions between the sub-objects are preferentially features derived from lung fissures shown in the object image.

The object image is, for example, a two-, three- or four-dimensional image data set. The image data set can be acquired by any imaging device, for example, by a magnetic resonance imaging device, an ultrasonic imaging device or a nuclear imaging device. Preferentially, the image data set is acquired by a computed tomography imaging device, which preferentially uses X-rays. The image data set is, for example, a technical image data set or a medical image data set. Preferentially, the image data set is a computed tomography image data set showing a lung or another part of a human being or animal.

In a preferred embodiment, the feature image generation unit is adapted for generating a feature image from the object image. Thus, the feature image can be generated without using other data. In particular, there is no need to use another image for generating the feature image acquired using other modalities.

It is preferred that the feature image generation unit comprises a feature enhancing unit for enhancing features related to intermediate regions between the sub-objects in the object image. Since the feature enhancing unit enhances the features related to intermediate regions between the sub-objects in the object image, these features are more pronounced in the feature image, which improves the quality of a segmentation using these features in the feature image. Thus, a feature image is preferentially generated by enhancing features related to intermediate regions between the sub-objects in the object image, wherein the image resulting from the enhancement is preferentially the feature image.

The feature enhancing unit preferentially uses an enhancement filter, which is based on either a structural tensor or a Hessian matrix. A more detailed description of this preferred enhancement filter is given further below.

In a further embodiment, the feature enhancing unit is adapted such that after applying an enhancement filter to the object image, a threshold operation is applied to image values of the enhanced object image for further enhancing the features related to intermediate regions between the sub-objects in the object image. The threshold operation is adapted such that, after the threshold operation has been applied, only image values are shown in the enhanced object image, which are above or below a predetermined threshold. The threshold operation can also be applied to the object image if, in another preferred embodiment, an enhancing filter is not applied to the object image. In this case, the object image, to which the threshold operation has been applied, is preferentially the feature image.

In a further embodiment, the feature enhancing unit is adapted such that planar or linear structures in the object image are enhanced. If the object comprising sub-objects is a three-dimensional object and if the object image is a three- or four-dimensional image, the feature enhancing unit is preferentially adapted for enhancing planar structures, because the intermediate regions between the sub-objects are in this case supposed to be planar-shaped features. If the object is a two-dimensional object or if the object image is a two-dimensional image, the feature enhancing unit is preferentially adapted for enhancing linear structures, because intermediate regions between the sub-objects are generally supposed to be linearly shaped in this case. In particular, if a lung comprising lung lobes has to be segmented, the feature enhancing unit is preferentially adapted for enhancing planar structures such as fissures. The feature enhancing unit can further be adapted for suppressing planar and/or linear structures which are not related to intermediate regions between sub-objects. For example, knowledge about the position and shape of outer lung walls can be used for suppressing these planar structures in the object image.

The feature enhancing unit preferentially enhances features related to intermediate regions between the sub-objects in the object image, wherein the object image comprising the enhanced features is a feature image.

In a further embodiment, the feature image generation unit comprises a distance unit for performing a distance transformation on the feature image, wherein the feature image comprises feature image elements, to which feature image values are assigned, wherein the distance transformation is performed in accordance with the following steps:

determining intermediate region feature image elements of the feature image elements, wherein the intermediate region feature image elements show features related to intermediate regions between the sub-objects, determining a distance value for a feature image element, wherein the distance value depends on the distance between a determined intermediate region feature image element and the feature image element for which a distance value is to be determined, replacing the feature image value, which is assigned to the feature image element for which the distance value has been determined, by the determined distance value. In a further embodiment, the distance values depend on the distance of the position of the respective feature image element to the closest intermediate region feature image element.

In preferred embodiments, a distance value can be the distance between the respective feature image element and the closest intermediate region feature image element, the inverse distance or a combination of these.

The use of distance values has the advantage that a transition between a part of the feature image, which does not show a feature related to intermediate regions between the sub-objects, and a part of the feature image, which shows features related to intermediate regions between the sub-object, is smoothed, which simplifies the detection of a feature in the feature image which can be used for segmenting the object comprising the sub-objects, thereby further improving the quality of the segmentation.

In a further embodiment, the segmentation unit comprises:
a model providing unit for providing a model object comprising model sub-objects,
a pre-positioning unit for pre-positioning the model object in the object image and the feature image, and
an adaptation unit for adapting the model object to the object in the object image and in the feature image.

This providing, pre-positioning and adapting of the model object allows segmentation of the object by adapting the model object to the object in the object image, which can be performed with low computational efforts, and which results in the quality of the segmentation being still improved.

In a further embodiment, the adaptation unit is adapted such that a surface of a model sub-object facing another model sub-object is adapted to the feature image and such that a surface of the model object, which does not face a model sub-object, is adapted to the object image. Since the feature image shows features related to intermediate regions between the sub-objects, the surfaces of a model sub-object facing another model sub-object, i.e. an inner surface of the model object, can be adapted to the feature image, i.e. to the features shown in the feature image which relate to intermediate regions between the sub-objects, with an improved quality, whereas a surface of the model object which does not face a model sub-object, i.e. an outer surface of the model object, can be adapted to the object image, i.e. to the outer surface of the object shown in the object-image, because in general this surface is easily detectable in the object image.

The adaptation of the model to the object in the object image or to the features in the feature image is preferentially performed by minimizing or maximizing an energy term comprising internal energy and external energy. The internal energy tries to hold the model in a predefined shape, while the external energy tries to move the surface of the model to the surface of the object in the object image or to the features shown in the feature image. This minimization or maximization of the energy term is preferentially performed iteratively. A more detailed description of this kind of energy minimization or maximization is disclosed in C. Lorenz, J. von Berg, A comprehensive shape model of the heart, Medical Image Analysis, vol. 10, pp. 657-670, 2006, which is herewith incorporated by reference.

In a further embodiment, the adaptation unit is adapted for adapting a surface of a model sub-object facing another model sub-object to the feature image by searching for an extremum in the feature image. The extremum is a minimum or a maximum. Such a minimum or maximum can be found in the feature image with high accuracy, in particular, if the feature image comprises distance values. The quality of the segmentation can therefore be further improved.

In a further embodiment,
the model providing unit is adapted for providing a surface object model and a volume object model, and
the pre-positioning unit is adapted for determining a transformation for registering the volume object model onto at least one of the object image and the feature image and for applying the determined transformation to the surface object model for pre-positioning the surface object model, and
the adaptation unit is adapted for adapting the surface object model to the object in the object image and the feature image.

Since a volume object model can generally be registered on the object image and/or the feature image with good quality, and since the transformation describing the registering of the volume object model onto the object image and/or the feature image is also applied to the surface object model, the registration of the surface object model and, thus, the adaptation of the surface object model is improved, allowing an improved segmentation, which uses the adapted surface object model.

The surface object model defines surfaces of the volume object model, preferentially at least one outer surface and at least one inner surface, which separates the sub-objects of the object. The volume model comprises preferentially several sub-volumes corresponding to sub-objects, wherein different sub-volumes are labeled differently.

The pre-positioning unit is preferentially adapted for determining an affine transformation for registering the volume object model onto at least one of the object image and the feature image. The affine transformation preferentially includes a translation and/or a scaling and/or a shearing of the model object. By using the affine transformation, the registering of the volume model object onto the object image and/or the feature image and, thus, the pre-positioning of the surface model object can be further improved, thereby further improving the segmentation. In a further embodiment, the volume object model is registered only on the object image and the transformation determined by this registration is also used for pre-positioning the surface model object in the feature image. In a further embodiment, the determination of the transformation for registering the volume object model onto at least one of the object image and the feature image is restricted for tuning the pre-positioning. The affine registration preferentially uses a similarity measure, which is preferentially the absolute value of the cross-correlation. In a further embodiment, the image is downsampled, i.e. reduced in size, prior to registration.

In a further embodiment, the pre-positioning unit is adapted for neglecting the inner structure of the volume object model. Since the inner structure of the volume object model is preferentially neglected during pre-positioning, the computational efforts for the pre-positioning procedure can be reduced. In particular, the volume object model is preferentially represented in a three-dimensional voxel data set, which corresponds, concerning dimensions, voxel size and voxel number, to the object image. In a further embodiment, in the voxel data set representing the volume object model, the voxels inside the volume object model comprise a constant non-zero value, in particular, "1", and the voxels outside the volume object model comprise a zero value. This voxel data set comprising constant non-zero values and zero values is preferentially registered with the object image for pre-positioning the volume object model with respect to the object image, in particular, by using a cross correlation as similarity measure, wherein the cross-correlation is applied to the voxel data set representing the volume object image and the object image.

In a further embodiment, the object comprises, besides the sub-objects, a structure of elements, wherein the model providing unit is adapted for providing a model of the structure of elements, and the pre-positioning unit is adapted for using a relationship between the model of the structure of elements and the model object for registering the object model by registering the model of the structure elements onto at least one of the object image and the feature image and further registering the object model, based on the registered model of the structure of elements and the relationship between the model of the structure of elements and the model object.

This allows using the structure of elements of the object, which is shown in the object image, for pre-positioning the model object in the object image and/or the feature image. The structure of elements, is, for example, a rib cage of a patient, and the model of this structure of elements is in this case a rib-cage model. Since the rib cage is generally well detectable in an image of a lung, in particular, in a computed tomography image, by using the rib cage and the rib cage model, the pre-positioning of the model object modeling, in this case, the lung can be improved. The relationship between the model of the structure of elements and the model object, which is used for registering the object model, is preferentially a spatial and/or temporal relationship.

In a further embodiment, the model object comprises a closed outer surface, which separates the model object from what is outside the model object, and at least one inner surface, which is located inside the model object, for separating the model sub-objects from each other. Such a model object is relatively simple, because it only provides at least one outer surface and at least one inner surface separating sub-objects, wherein computational costs for the segmentation procedure are reduced.

In a further embodiment, the model providing unit is adapted for providing the model object comprising the model sub-objects by performing the following steps:

providing several object images comprising object image elements, segmenting the sub-objects in the several object images, registering the several object images comprising the segmented sub-objects onto each other, fuzzying the segmented sub-objects in the several registered object images such that fuzzy values are assigned to the object image elements of the several registered object images for each segmented sub-object, wherein for each segmented sub-object a fuzzy value is assigned to an object image element of the registered object images, wherein the fuzzy value depends on the probability that the object image element of the respective registered object image belongs to the respective segmented sub-model, averaging the fuzzy values assigned to corresponding object image elements of the several registered object images for each segmented sub-object, such that for a group of corresponding object image elements of the several registered object images an average fuzzy value is generated, assigning a group of corresponding object image elements of the several registered object images to a segmented sub-object in dependence on the average fuzzy values assigned to this group for the respective segmented sub-object. A group of corresponding object image elements comprises preferentially object image elements, which lie on top of each other after the registration has been performed.

A model providing unit adapted for performing these steps provides a model object, which further improves the quality of the segmentation, if this model object is used for segmenting the object comprising sub-objects.

In a further aspect of the present invention, a method of segmenting an object comprising sub-objects shown in an object image is provided, wherein the method comprises the following steps:

generating a feature image showing features related to intermediate regions between the sub-objects by means of a feature image generation unit, segmenting the sub-objects by using the object image and the feature image by means of a segmentation unit.

In a further aspect of the present invention, a computer program for segmenting an object comprising sub-objects shown in an object image is provided, wherein the computer program comprises program code means for carrying out the steps of the method as defined herein, when the computer program is run on a computer.

In a further aspect of the present invention, a model of an object comprising sub-objects is provided, wherein the model is generated in accordance with the following steps:

providing several object images comprising object image elements, segmenting the sub-objects in the several object images, registering the several object images comprising the segmented sub-objects onto each other, fuzzying the segmented sub-objects in the several registered object images such that fuzzy values are assigned to the object image elements of the several registered object images for each segmented sub-object, wherein for each segmented sub-object a fuzzy value is assigned to an object image element of the registered object images, wherein the fuzzy value depends on the probability that the object image element of the respective registered object image belongs to the respective segmented sub-model, averaging the fuzzy values assigned to corresponding object image elements of the several registered object images for each segmented sub-object, such that for a group of corresponding object image elements of the several registered object images an average fuzzy value is generated, assigning a group of corresponding object image elements of the several registered object images to a segmented sub-object in dependence on the average fuzzy value assigned to this group for the respective segmented object.

It shall be understood that the apparatus described herein, the method described herein and the computer program described herein have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiments described hereinafter. In the following drawings

DETAILED DESCRIPTION OF EMBODIMENTS

Figure 1:
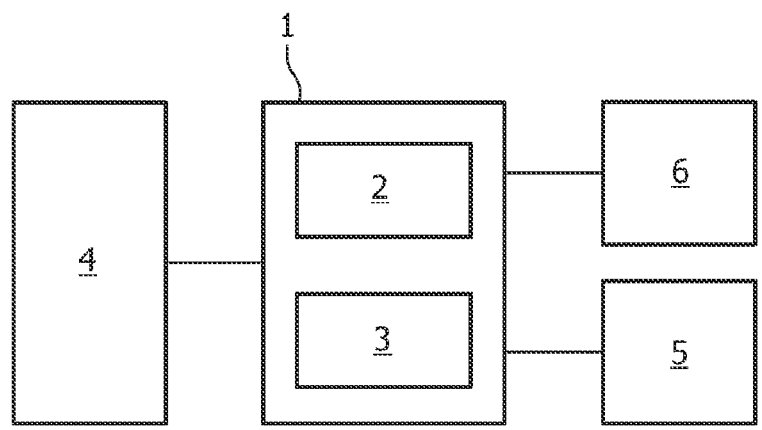
FIG. 1 shows schematically and exemplarily a representation of an apparatus for segmenting an object comprising sub-objects.

FIG. 1 shows schematically and exemplary an apparatus for segmenting an object comprising sub-objects. The apparatus 1 comprises a feature image generation unit 2 for generating a feature image showing features related to intermediate regions between the sub-objects and a segmentation unit 3 for segmenting the sub-objects by using an object image showing the object and the feature image. An input unit 5 is connected to the apparatus 1 for allowing a user to make inputs into the apparatus 1. In addition, an output unit 6 is connected to the apparatus 1 for outputting, for example, the segmentation result. The input unit is, for example, a keyboard or a mouse and the output unit is, for example, a display or a printer. The apparatus 1 is further connected to an object image providing unit 4 for providing an object image. The object image providing unit 4 is, in this embodiment, a computed tomography system, which reconstructs a computed tomography image from acquired X-ray projection data. In another embodiment, the object image providing unit can be any other imaging device like a magnetic resonance imaging device, an ultrasonic imaging device, a nuclear imaging device or an optical imaging device. In a further embodiment, the object image providing unit is a storage unit, which stores object images, which can be transferred to the apparatus 1.

Figure 2:
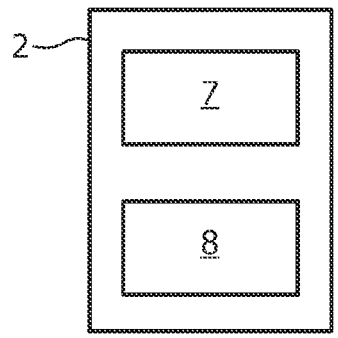
FIG. 2 shows schematically and exemplarily a representation of a feature image generation unit of the apparatus for segmenting an object comprising sub-objects.

FIG. 2 shows schematically and exemplarily the feature image generation device 2 comprising a feature enhancing unit 7 for enhancing features related to intermediate regions between the sub-objects in the object image and a distance unit 8 for performing a distance transformation on the feature image, wherein feature image values of the feature image are replaced by distance values, which depend on the distance of the position of the respective feature image value to a feature image element, which shows a feature related to intermediate regions between sub-objects. In particular, the feature image comprises feature image elements, to which feature image values are assigned, wherein the distance transformation is preferentially performed in accordance with the following steps:

determining intermediate region feature image elements of the feature image elements, wherein the intermediate region feature image elements show features related to intermediate regions between the sub-objects, determining a distance value for a feature image element, wherein the distance value depends on the distance between a determined intermediate region feature image element and the feature image element for which a distance value is to be determined, replacing the feature image value, which is assigned to the feature image element for which the distance value has been determined, by the determined distance value. In this embodiment, the distance value is the distance between the respective feature image element and the closest intermediate region feature image element. In other embodiments, the distance value can be the inverse distance or a combination of the latter and former embodiments.

Figure 3:
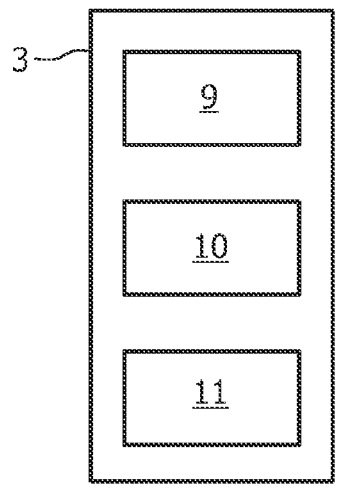
FIG. 3 shows schematically and exemplarily a representation of a segmentation unit of the apparatus for segmenting an object comprising sub-objects.

FIG. 3 shows schematically and exemplarily the segmentation unit 3 comprising a model providing unit 9, a pre-positioning unit 10 and an adaptation unit 11.

The model providing unit 9 is adapted for providing a model object comprising model sub-objects. The model object can be a volume model object or a surface model object. In this embodiment, the model object is a surface model object. An embodiment of a surface model object of a lung comprising lung lobes as sub-objects is schematically and exemplarily shown in FIG. 4.

Figure 4:
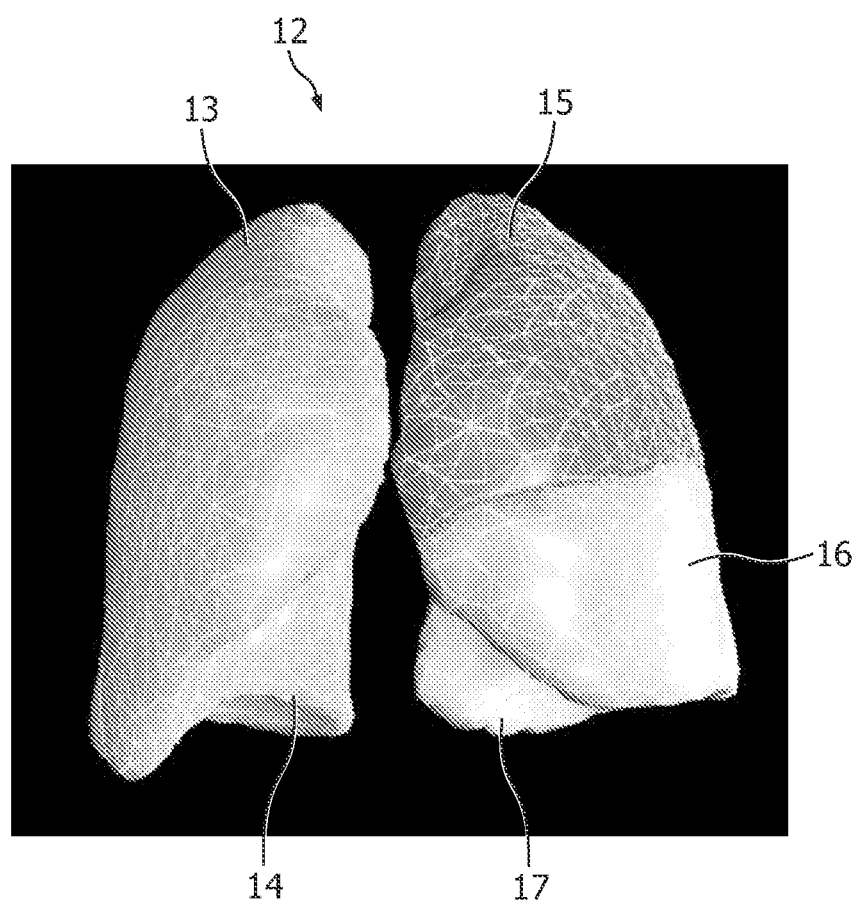
FIG. 4 shows schematically and exemplarily a surface model object.
Figure 5:
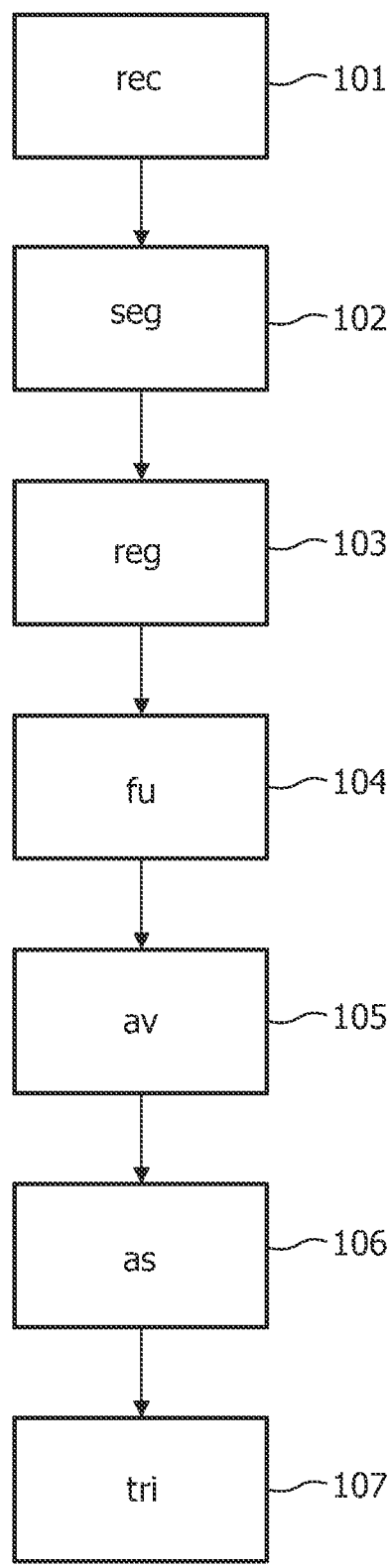
FIG. 5 shows a flow chart illustrating a method of generating a surface object model by means of a model providing unit, FIG. 6 schematically and exemplarily shows labels from a segmented object image in a sectional view, FIG. 7 schematically and exemplarily shows the labels from a segmented object image in a sectional view after a fuzzification has been applied, FIG. 8 schematically and exemplarily shows the volume object model in a sectional view after an averaging and assigning step, FIG. 9 schematically and exemplarily shows a volume object model within an object image in a sectional view, FIG. 10 schematically and exemplarily shows the volume model object in a sectional view after a registration has been performed within the object image.

In FIG. 4, a lung model 12 having a triangulated mesh surface is exemplarily and schematically shown. The left lung comprises two lung lobes 13 and 14 and the right lung comprises three lung lobes 15, 16 and 17. The surfaces of different lung lobes comprise different labels. The model consists of a geometric mesh where one closed surface models the lung wall and additional surfaces within the lung volume model the lung fissures that separate the lung lobes. The lung fissures are, in this embodiment, the features related to intermediate regions between the sub-objects, i.e., in this embodiment, the lung lobes. Such a mesh model can be constructed by triangulation of an average label data set, where voxels belonging to different lung lobes have distinct "inside" labels and voxels outside the lung volume have an "outside" label. Such an average label data set can be calculated from a training set of patient images where the lung lobe areas are labeled by an automated or interactive procedure. In this embodiment, the model providing unit is adapted for providing a model object comprising model sub-objects by performing steps, which will be described in the following with reference to a flow chart shown in FIG. 5.

In step 101, several object images, preferentially, from different objects of the same type, in particular, of lungs of different patients, are received by the model providing unit. These several object images are preferentially computed tomography images showing a lung of a patient. The several object images comprise object image elements, in particular, voxels or pixels.

In step 102, the different sub-objects in the object images are segmented by, for example, a known segmentation procedure or by hand. In step 103, the several object images are registered with respect to each other. In particular, one of these object images is selected as a reference object image and the other object images are registered to this reference object image. In another preferred embodiment, the reference object image, to which the other object images are registered, is obtained by performing step 102 and the steps 104 to 106, which will be explained further below, for a first iteration.

The registration in step 103 is preferentially performed by using an affine transformation, which includes preferentially translation, scaling and/or shearing operations.

In step 104, the segmented sub-objects in the several registered object images are fuzzified such that fuzzy values are assigned to image elements of the several registered object images for each segmented sub-object, wherein for each segmented sub-object and for each registered object image a fuzzy value is assigned to each object image element of the registered object images, wherein the fuzzy value depends on a probability that the object image element of the respective registered object image belongs to the respective segmented sub-model.

Figure 6:
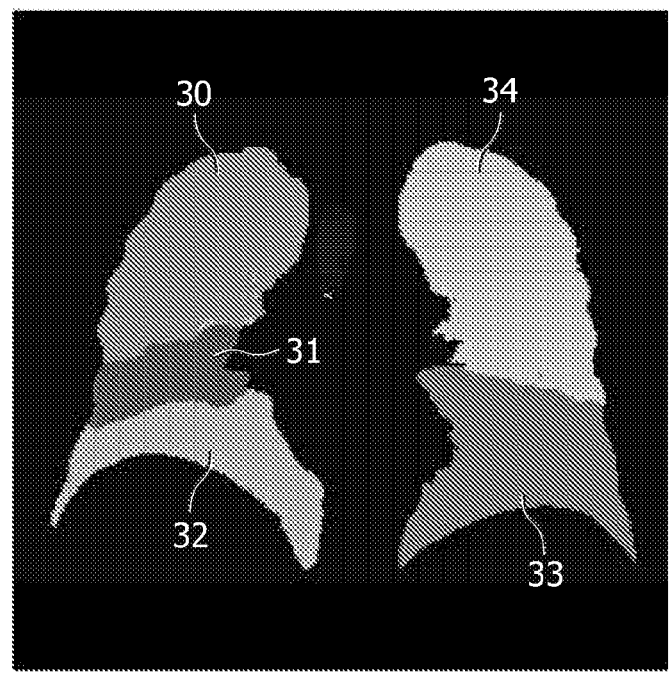
Figure 7:
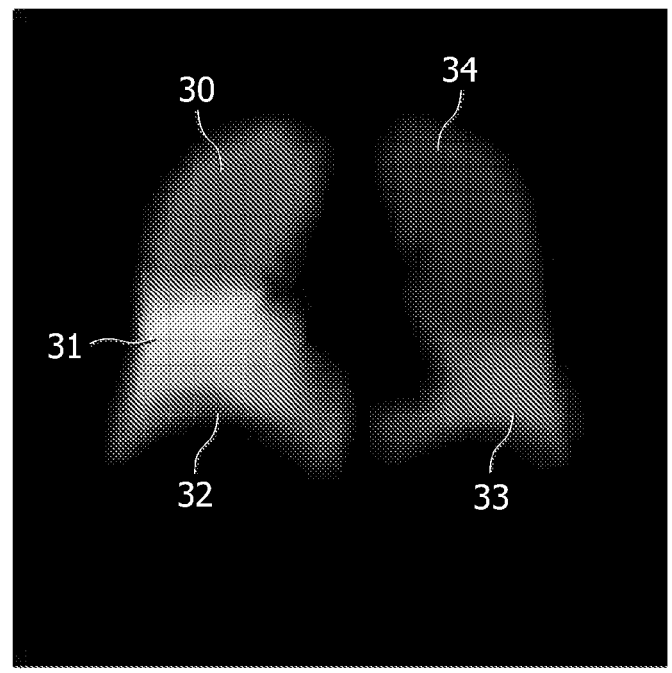

Preferentially, in step 102, to each segmented sub-object a different label is assigned and a further label is assigned to regions outside the sub-objects. In step 104, preferentially the fuzzification is applied to the boundaries of the sub-objects, in particular, to lung lobe boundaries, resulting in a variation between 0 and 1 with a certain distance from the label transition, with values greater than 0.5 "inside" the label area and values less than 0.5 "outside" the label area. Such a contiguous "fuzzy" label image is preferentially produced for every label separately, wherein preferentially a linear variation with boundary distance is selected. FIG. 6 shows schematically and exemplarily one of the several object images with the segmented labeled regions 30, 31, 32, 33, 34, which have been labeled differently. FIG. 7 shows the differently labeled regions after the fuzzification has been applied in step 104.

Preferentially, the different segmented sub-objects are separated into different single images, wherein each image shows a sub-object of one of the several object images received in step 101, and the fuzzification in step 104 is applied to each of these single sub-objects.

In step 105, fuzzy values resulting from the fuzzification in step 104 are averaged. In particular, the fuzzy values assigned to corresponding object image elements of the several registered object images are averaged for each segmented sub-object, such that for a group of corresponding object image elements of the several registered object images an average fuzzy value is generated. In particular, corresponding fuzzy values of corresponding sub-objects are summed up and the resulting sum is divided by the number of the several object images. In step 106, an image element of the several object images, i.e. a group of corresponding object image elements of the several registered object images, is assigned to a sub-object in dependence on the average fuzzy value for the respective image element. In particular, after averaging the individual fuzzy label images, i.e. the fuzzy values, the label with the highest fuzzy value is chosen, if this fuzzy value is above a predefined threshold or if, in particular, the sum of all fuzzy values for the respective image element is larger than 0.5.

Finally, after, in step 106, each image element has been assigned to one of the sub-objects or to a region outside the object, a triangulation procedure can be applied for generating a triangulated mesh model in step 107.

In a preferred embodiment, the model providing unit can be adapted such that the volume model resulting from step 106 is used for registering the several object images received in step 101 onto this volume model object and for performing steps 102 to 106 again with these newly registered object images; preferentially in the first iteration for generation of a volume model, which is to be used for registration, the registration step 103 is omitted.

In step 107, for generating a mesh from the volume model, a curvature adaptive triangulation method is preferentially used that separates differently labelled "inside" volumes. An important parameter for the implementation of the curvature adaptive triangulation method is a preselected number of surface triangles, which are preferentially schematically varied and checked against the meshed label volume. Preferentially, morphological smoothing is used to remove small holes and rough sub-object boundaries, in particular, rough lobe boundaries.

Figure 8:
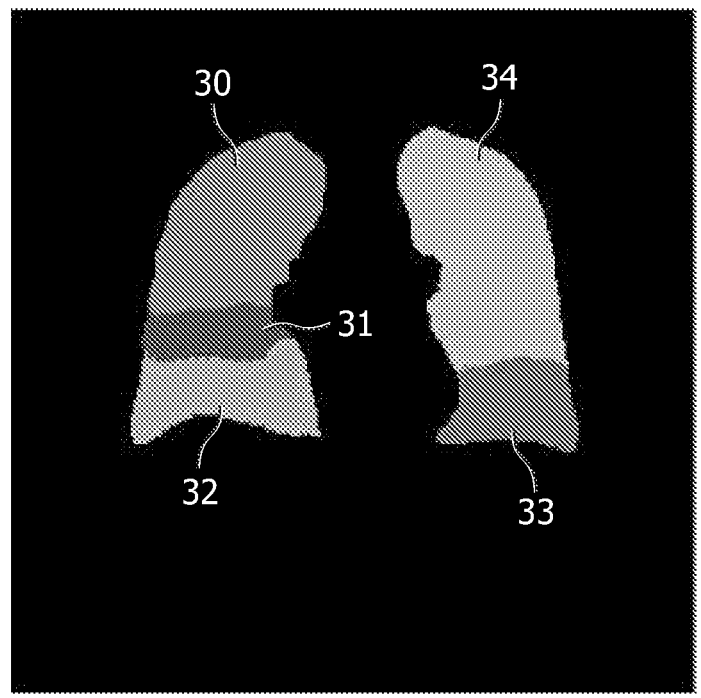

FIG. 8 shows schematically and exemplarily a slice through a volume object model obtained in step 106.

In a preferred embodiment, the model providing unit 9 is adapted for providing a surface object model 12 and a volume object model 21, which are, for example, generated by performing the above described steps 101 to 107.

If a surface object model, in particular, a surface mesh object model, is already present, a volume object model can be generated from the surface object model by, for example, a region growing or scan line procedure.

Figure 9:
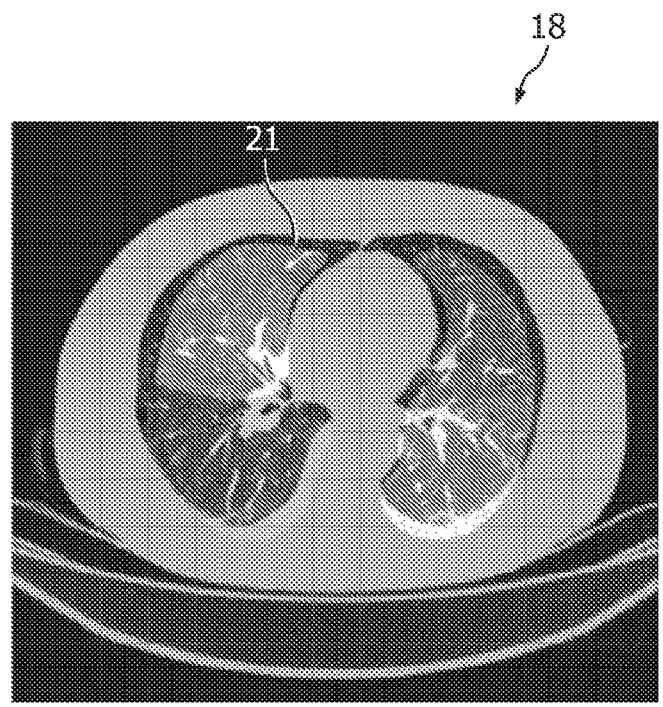
Figure 10:
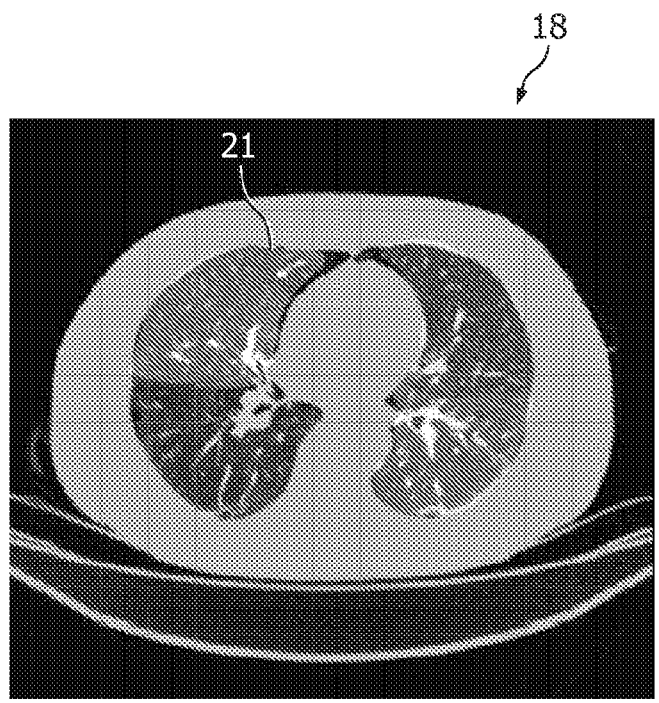

The pre-positioning unit 10 is preferentially adapted for determining a transformation for registering the volume object model 21 onto at least one of the object image 18 and/or the feature image and for applying the determined transformation to the surface object model 12 for pre-positioning the surface object model 12. In this embodiment, the pre-positioning unit 10 is adapted for determining a transformation for registering the volume object model 21 onto the object image 18 and for applying the determined transformation to the surface object model 12 for pre-positioning the surface object model 12. FIG. 9 shows schematically and exemplarily a slice through a three-dimensional image of a lung, wherein the volume object model 21 is initially placed within the object image 18. This initial positioning can be an arbitrary positioning or, for example, a positioning whereby the volume object model 21 is positioned in the center of the object image 18. FIG. 10 shows schematically and exemplarily the volume object model 21 within the object image 18, after the registration has been performed. The transformation, which corresponds to the registration, is preferentially an affine transformation, which includes translation, scaling and/or shearing.

For determining the transformation for registering the volume object model onto the object image, the volume model object preferentially consists of pixels or voxels with label "1" if they belong to the object area, in particular, to the lung area, and label "0" otherwise. The corresponding image is then registered onto the individual object image, in particular, an individual patient image showing a lung of a patient, for example, by a method that allows for an affine transformation of the entire image. The resulting geometric transformation is applied to the equivalent surface object model, resulting in the desired pre-positioned surface object model. By using restricting transformation parameters during the registration, the pre-positioning can be tuned to allow for stronger object variations, in particular, stronger patient variations, or to stick closer to the original shape as, for example, in the case of severe pathologies The pre-positioning unit 10 preferentially neglects the inner structure of the volume object model during the determination of the transformation, which registers the volume object model onto at least one of the object image and the feature image.

If the object image comprises, besides the sub-objects, a structure of elements such as, for example, a rib cage, which can be seen in an object image, it is preferred that the model providing unit is adapted for providing a model 22 of the structure of elements, in particular, a rib-cage model 22. It is then further preferred that the pre-positioning unit 10 is adapted for providing a relationship between the model of the structure of elements, in particular, the model 22 of the rib cage, and the model object, which is, preferentially, a surface object model. In a further embodiment, the pre-positioning unit 10 is adapted for registering the model of the structure of elements, in particular, the rib-cage model 22, onto at least one of the object image and the feature image and for registering the object model by using the registered model of the structure of elements, in particular, the registered model 22 of the rib cage, and by using the relationship between the model of the structure of elements and the model object. This registering preferentially includes an affine transformation.

The use of a structure of elements in the object image for pre-positioning the object model is particularly helpful if a lung comprising lung lobes has to be segmented, wherein the object image, i.e. the lung image, shows a rib cage, because the shape of the lungs is well defined by the surrounding rib cage and the ribs are much clearer defined in computed tomography images, which are preferentially used in this embodiment, than lung structures. Thus, preferentially an adapted rib-cage model serves as a reference for the initial lung model position. For providing a rib-cage model, the procedure described in "Geometrical Rib-Cage Modeling, Detection, and Segmentation", Tobias Klinder, Cristian Lorenz, Jens von Berg CARS 2007, Volume 2 Supplement 1, pp. S91-S93 can be used, which is herewith incorporated by reference.

Figure 11:
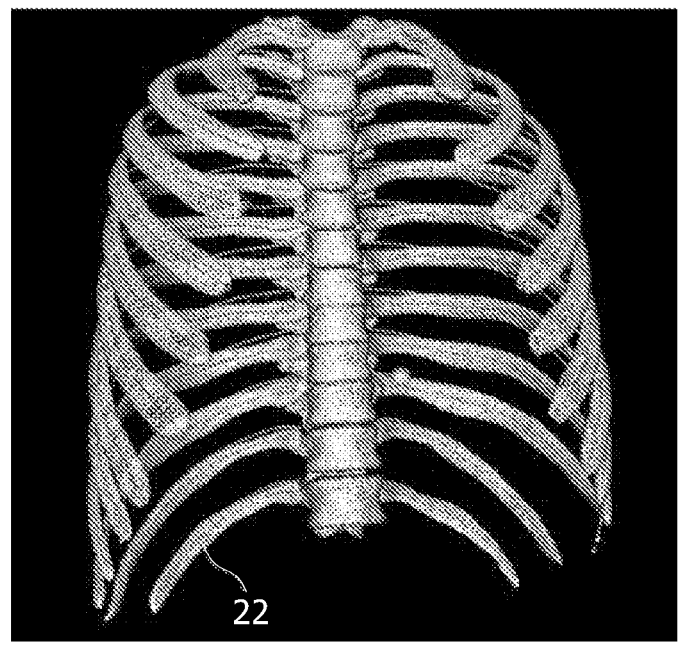
FIG. 11 shows a model of a structure of elements.
Figure 12:
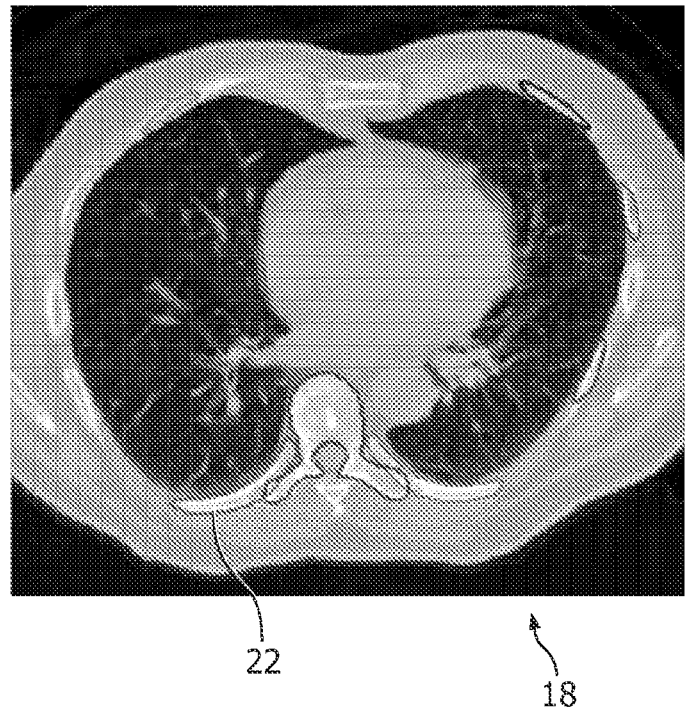
FIG. 12 shows in a sectional view the model of a structure of elements registered and adapted to an object image.

A rib-cage model 22 is schematically and exemplarily shown in FIG. 11. The geometrical transformation between the rib-cage model and the lung model is known. In order to pre-position the lung model to a given object image, i.e. a given lung image of a patient, ribs in the lung image that correspond to model ribs of the rib-cage model 22 are detected and identified as, for example, described in "Automated Model-Based Rib Cage Segmentation and Labeling in CT Images", Tobias Klinder, Cristian Lorenz, Jens von Berg, Sebastian P. M. Dries, Thomas Bülow, and Jörn Ostermann, to appear at MICCAI 2007, which is also herewith incorporated by reference. Then the rib-cage model 22 is registered onto the lung image, using preferentially an affine transformation. A slice through a lung image 18, wherein the rib-cage model 22 is registered onto the ribs in the lung image 18, is schematically and exemplarily shown in FIG. 12. In another embodiment, the model of the structure of elements can be adapted to the object shown in the object image, in particular, the rib-cage model 22 can be adapted to the lung image 18. Knowing the geometrical transformation from the model space to the object image for the rib-cage model, the lung model can easily be positioned.

The lung model pre-positioned by rib-cage detection could directly be used without further adaptation if a rough estimation of, for example, lobe volumes is sufficient for a given application. The use of this approach to pre-position a lung can be even more accurate than using a registration approach, since the rib cage adaptation gives a refined rib model alignment, which can be propagated to the lung model to provide a refined lung model alignment. This can be of particular importance for highly pathological cases where the lung shape is not clearly delineated in the image.

The adaptation unit 11 is adapted for adapting the object model, in particular, the surface object model, which has been provided by the model providing unit 9 and which has been pre-positioned by the pre-positioning unit 10. The adaptation unit 11 is preferentially adapted such that a surface of a model sub-object of the model object facing another model sub-object is adapted to the feature image generated by the feature image generation unit 2 and such that a surface of the model object, in particular, of the surface model object, which does not face a model sub-model object, is adapted to the object image. In this embodiment, the adaptation unit 11 is adapted for adapting a surface of a model sub-object facing another model sub-object to the feature image by searching for a minimum in the feature image, which contains distance values calculated by the distance unit 8. The adaptation performed by the adaptation unit 11 will be explained in more detail further below with respect to a method of segmenting an object comprising sub-objects.

Figure 13:
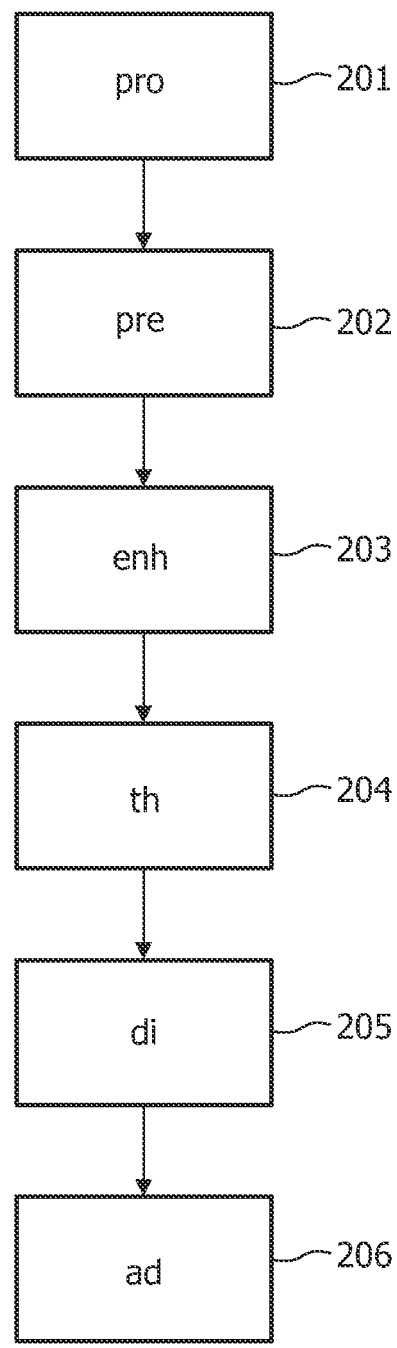
FIG. 13 shows a flow chart illustrating an embodiment of a method of segmenting an object comprising sub-objects, FIG. 14 schematically and exemplarily shows a surface object model pre-positioned onto an object image in a sectional view, FIG. 15 schematically and exemplarily shows a feature image after an enhancing filter has been applied in a sectional view, FIG. 16 schematically and exemplarily shows a feature image comprising distance values and a pre-positioned surface object model in a sectional view, FIG. 17 schematically and exemplarily shows a surface object model in a sectional view after adaptation in an object image and FIG. 18 schematically and exemplarily shows a feature image comprising distance values with an adapted surface model object in a sectional view.

In the following, a method of segmenting an object comprising the sub-objects will be explained with reference to a flow chart shown in FIG. 13.

In step 201, the model providing unit 9 provides, in this embodiment, a surface model object comprising surface model sub-objects and a volume model object comprising volume model sub-objects. In another embodiment, the model providing unit can comprise a surface model object or a volume model object. The model providing unit 9 can also provide a model of a structure of elements, which are not the sub-objects, like a rib-cage model. The surface model object and the volume model object are preferentially models of a lung comprising lung lobes, wherein the model object comprises a closed outer surface and several inner surfaces for separating the lung lobes.

In step 202, the surface model object is pre-positioned within an object image, which is preferentially a computed tomography thorax image. This pre-positioning is performed by the pre-positioning unit 10 by pre-positioning the corresponding volume object model within the object image and by knowing the spatial relationship between the volume object model and the surface object model as described in more detail above. In another embodiment, a model of a structure of elements, which are not the sub-objects, for example, a rib-cage model, and the spatial relationship between the surface object model and the model of the structure of elements, or between the model of the structure of elements and a volume object model, can be used for pre-positioning the surface object model or a volume object model within the object image as described above in more detail.

Figure 14:
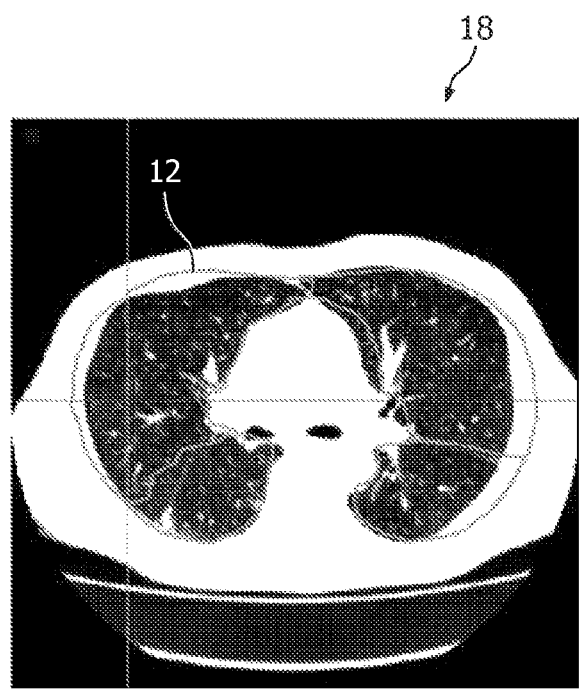

FIG. 14 shows schematically and exemplarily a representation of an object model 12, which has been pre-positioned within a computed tomography lung image being an object image.

In step 203, an enhancement filter is applied to the object image for enhancing features related to intermediate regions between the sub-objects in the object image. Since the object is preferentially a three-dimensional object in a three-dimensional or four-dimensional image data set, the feature enhancing unit 7 is preferentially adapted such that planar structures are enhanced. The feature enhancing unit 7 preferentially uses the first derivative from the structure sensors or the second derivative from a Hessian matrix. After the enhancing filter has been applied to the object image, a feature image is generated showing features related to intermediate regions between the sub-objects; in particular, if the object is a lung comprising lung lobes, the feature image shows preferentially lung fissures.

The fissure enhancing filter is preferentially based alternatively on either the structure tensor or the Hessian matrix.

The structure tensor is preferentially a local structure tensor J, which is built by sampling the outer vector product of the three-dimensional gradient vector in a Gaussian weighted neighborhood around the filter center:

$$J = \begin{bmatrix} \langle g_x g_x \rangle & \langle g_x g_y \rangle & \langle g_x g_z \rangle \\ \langle g_y g_x \rangle & \langle g_y g_y \rangle & \langle g_y g_z \rangle \\ \langle g_z g_x \rangle & \langle g_z g_y \rangle & \langle g_z g_z \rangle \end{bmatrix} = \langle [gg^T] \rangle,$$

wherein <.> denotes the Gaussian weighted averaging over a local neighborhood, which is e.g. defined as a sphere of n millimeters. The local structure tensor is, for example, disclosed in "Signal Processing for Computer Vision", G. H. Granlund and H. Knutsson, Luwer Academic Publishers, 1995 and "Tensor-based image sequence processing techniques for the study of dynamical processes", H. Haussecker, H. Spies and B. Jane, International Symposium on Realtime Imaging and Dynamic Analysis, 1998, which are herewith incorporated by reference.

The structure tensor is preferentially built from the image value derivatives at each point in the object image and represents the distribution of gradient vectors around this point. At plane-like features, in particular, at plane-like fissures, a so-called simple neighbourhood is expected, which is, for example, described in "Neighborhood Operators", B. Jähne and H. Haußecker, Computer Vision and Applications, Academic Press, London 2000, which is herewith incorporated by reference, and which is characterized by one predominant and two vanishing gradient orientations. A property of the tensor is that due to the squaring of the gradient vectors, anti-parallel gradient vectors (on both sides of the fissure) contribute in the same fashion. The structure sensor J is positive semi-definite, three positive eigenvalues $\lambda_0 \geq \lambda_1 \geq \lambda_2$ can be determined, and a directional coherency measure can be defined:

$$C = \frac{\lambda_0 - \lambda_1}{\lambda_0 + \lambda_1},$$

which becomes 1 for only one predominant gradient orientation, and 0 for two or three equally strong gradient orientations. Then the fissuredness $F_1$ can be computed as $$F_1 = e^{-(I-\mu)^2/2\sigma^2} C$$

using a weighting term which describes how well the, in particular gray, image value I at the filter center corresponds to the typical image value, in particular the gray value μ for fissures, with a standard deviation σ.

The Hessian matrix approach uses the fact that at a planar structure like a fissure, one strong curvature of the image value profile, in particular of a gray value profile, perpendicular to the fissure, and two vanishing curvatures parallel to the fissure are expected. For each voxel in the Hounsfield range of fissures, the local Hessian matrix H is built using the six independent second derivatives:

$$H = \begin{bmatrix} g_{xx} & g_{xy} & g_{xz} \\ g_{yx} & g_{yy} & g_{yz} \\ g_{zx} & g_{zy} & g_{zz} \end{bmatrix},$$

The derivatives are preferentially computed after applying a binomial smoothing to the original image. Then the eigenvalues $|\lambda_0| \geq |\lambda_1| \geq |\lambda_2|$ of the symmetric Hessian matrix are determined. For a high intensity object on a low intensity background the most significant eigenvalue is preferentially demanded to be negative, $\lambda_0 < 0$, otherwise the fissuredness for this point is preferentially set to $F_2 = 0$. If $\lambda_0 < 0$, then a normalized planeness P is preferentially computed:

$$P = \frac{|\lambda_0| - |\lambda_1|}{|\lambda_0| + |\lambda_1|},$$

which becomes 1 for one significant eigenvalue $\lambda_0$ and two vanishing eigenvalues $\lambda_1$ and $\lambda_2$, and 0 if the two most significant eigenvalues are equal. Then the fissuredness $F_2$ is computed as $$F_2 = e^{-(I-\mu)^2/2\sigma^2} P$$

using again a weighting term which describes how well the, in particular gray, image value I at this point corresponds to the typical image value, in particular, a gray value, μ for the features related to intermediate regions between the sub-objects, in particular for fissures, with a standard deviation σ.

The weighting term $e^{-(I-\mu)^2/2\sigma^2}$ related to the mean Hounsfield value of the fissures is used for suppressing other planar structures like e.g. the lung walls. The expected mean Hounsfield value of the fissures μ is estimated individually for each dataset. A prior segmentation of the lung volume is preferentially used to establish a Hounsfield histogram of the lung parenchyma. The expected mean fissure μ is then set to a certain value above the characteristic mean parenchyma.

A more detailed description of an enhancement filter based on either the first derivative from the structure sensor or the second derivative from a Hessian matrix is, for example, disclosed in sections 2.1. to 2.3 of "Unsupervised extraction of the pulmonary interlobar fissures from high resolution thoracic CT data", International Congress Series, volume 1281, May 2005, pages 1121-1126, CARS 2005, Computer Assisted Radiology and Surgery, Rafael Wiemker, Thomas Bülow, Thomas Blaffert, which is herewith incorporated by reference.

Although the preferred enhancement filter based on either the first derivative from the structure sensor or the second derivative from a Hessian matrix has been described with respect to fissures of a lung, in other embodiments this preferred enhancement filter can be used for enhancing other planar features related to intermediate regions between the sub-objects in the object image.

Figure 15:
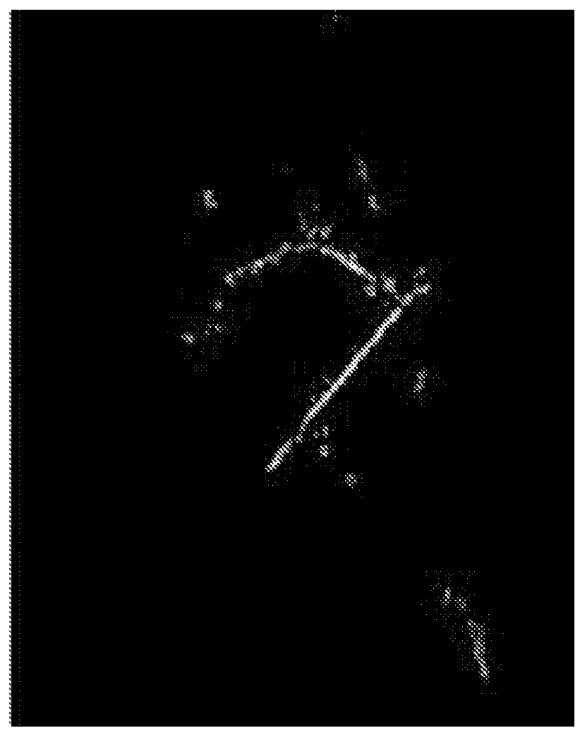

FIG. 15 shows schematically and exemplarily a feature image 19 generated by applying the enhancing filter onto the object image.

In step 204, a threshold filter is applied to the feature image such that feature elements above a given threshold are shown only in the feature image. In other embodiments, another threshold filter can be used for thresholding the feature image such that the features related to intermediate regions between the sub-objects are further enhanced.

Figure 16:
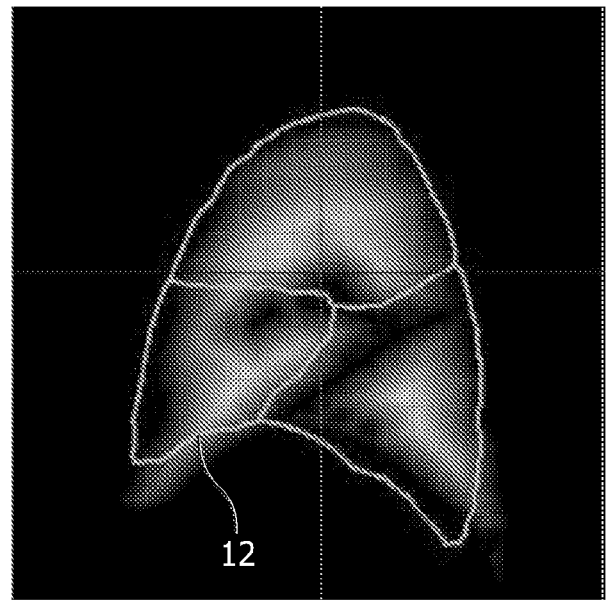

In step 205, the distance unit 8 performs a distance transformation on the feature image, wherein preferentially the following steps are performed:

determining intermediate region feature image elements of the feature image elements, wherein the intermediate region feature image elements show features related to intermediate regions between the sub-objects, determining a distance value for a feature image element, wherein the distance value depends on the distance between a determined intermediate region feature image element and the feature image element for which a distance value is to be determined, replacing the feature image value, which is assigned to the feature image element for which the distance value has been determined, by the determined distance value. In this embodiment, each feature image value of the feature image is replaced by the distance of the position of the respective image element within the feature image to the closest intermediate region feature image element, which shows, in particular, a part of a lung fissure. A resulting feature image with distance values is exemplarily and schematically shown in FIG. 16. FIG. 16 shows the feature image 19 having distance values together with a representation of the model object 12 in a sectional image through the three-dimensional object image.

In step 206, the adaptation unit 11 adapts the object model, which is in this embodiment a surface model object, using the object image and the feature image. The inner surfaces of the object model, i.e. the surfaces of the model sub-objects, which face another model sub-object, are adapted by using the feature image and the outer surface of the object model is adapted by using the object image. In particular, for the adaptation an energy term is minimized or maximized comprising two energies, an internal energy and an external energy. The internal energy tries to maintain the shape of the object model and the external energy tries to move the surface of the object model to the corresponding features in the object image and in the feature image, respectively.

The external energy is, for example, the sum over the external energy terms for each triangle of a mesh surface, which are obtained from a search for the strongest gradient along the triangle surface normal. The external energy for each triangle is a function of this gradient value. For fissure triangles the search is done in the feature image, where the optimal point is preferentially located at a minimal feature value and the external energy value also is this minimal feature value.

The internal energy is preferentially the sum of the internal energy terms for each vertex. This internal vertex energy takes all edges into consideration that contain this vertex and calculates for each of the edges the difference before and after adaptation.

A more detailed description of this adaptation process is disclosed in the above mentioned article by C. Lorenz, J. von Berg, A comprehensive shape model of the heart, Medical Image Analysis, vol. 10, pp. 657-670, 2006, which is herewith incorporated by reference.

Figure 17:
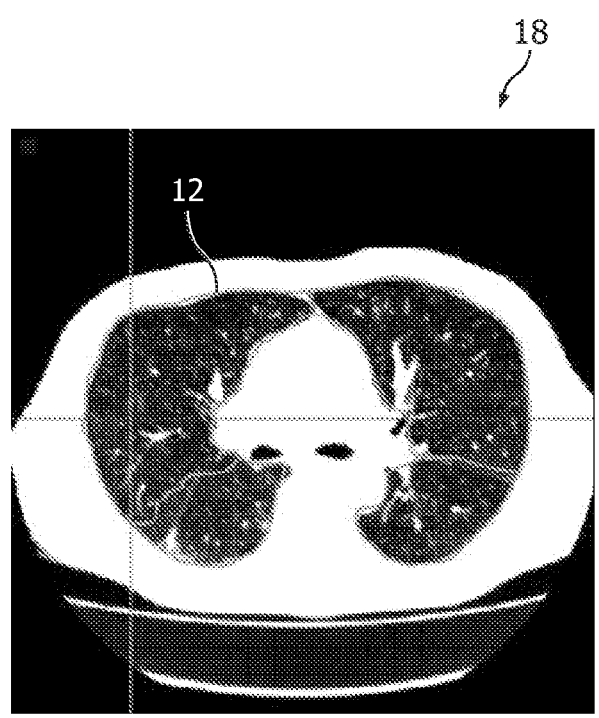
Figure 18:
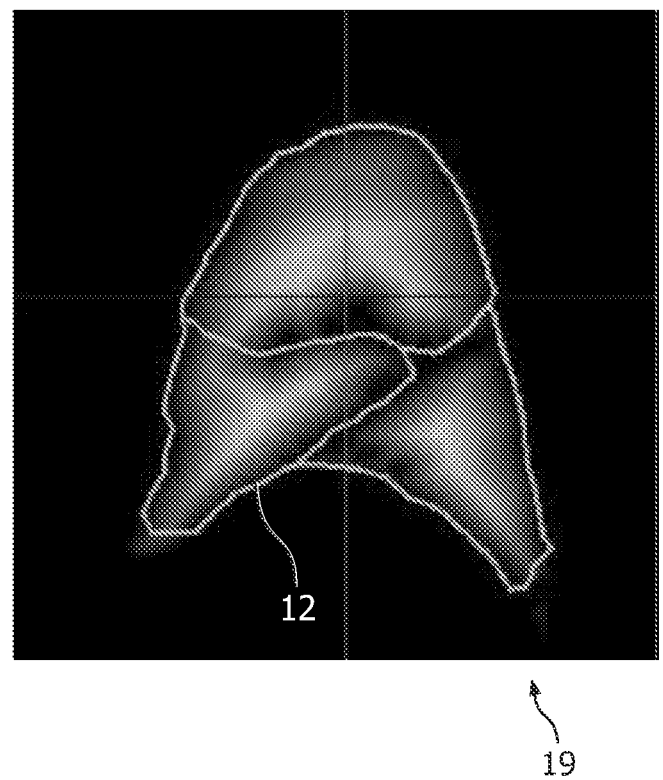

The adapted model object 12 is schematically and exemplarily shown in two different sectional views in FIGS. 17 and 18: in FIG. 17 in the object image 18 and in FIG. 18 in the feature image 19.

In this embodiment, the feature image is input to the adaptation for the fissure surfaces, wherein the adaptation is done with a search towards minima in the feature image. If fissures are not visible, and thus there is no distinguished minimum in the feature image comprising the distance values, the adaptation is mainly controlled by terms that keep the surface points of the surface object model in the default relative position to neighbors. By this approach, always a good segmentation is obtained, if fissures are visible, and segmentation to the best anatomical knowledge is obtained, if fissures are not visible.

In other embodiments, step 203 to 205 can be performed before step 201 to 202. Steps 201, 202 and 206 can be combined to a segmentation step and steps 203, 204 and 205 can be combined to a feature image generation step, wherein, if such a combination is performed, the feature image generation step has to be performed before the segmentation step. In other embodiments, the feature image generation step can be a combination of other steps as long as the feature image generation step yields a feature image showing features related to intermediate regions between the sub-objects. For example, the feature image comprising the distance values, which can be regarded as a distance map, can also be an inversed distance map from segmented vessels in the case of a lung image as an object image or a combination of a distance map and such an inverse distance map. Furthermore, any enhancing filter which enhances features related to intermediate regions between the sub-objects in the object image can be used by the feature enhancing unit 7 in step 203. Moreover, the threshold step 204 can be omitted and also the determination of the distance values in step 205 can be omitted.

A number of diagnostic procedures benefit from the described segmentation of lung lobes due to faster and/or more accurate reporting of radiological findings. Examples are the automated quantification of emphysema or embolisms that takes the anatomy into account, localization of lung nodules, and a lobe-wise characterization of bronchia. The segmentation is preferentially performed automatically and allows, for example, for an automated volume measurement for emphysema quantification or nodule detection.

Although in the above described embodiments the object is preferentially a lung comprising lung lobes, in other embodiments the object can be any other object comprising sub-objects, for example, a technical object comprising sub-objects.

Although in the above described embodiment the object image is preferentially a computed tomograph image, in other embodiments, the object image can be any other image showing an object comprising sub-objects, which has to be segmented, like a magnetic resonance image, an ultrasonic image, a nuclear image, a thermal image or an optical image. Other variations to the disclosed embodiment can be understood and effected by those skilled in the art in practising the claimed invention, from a study of the drawings, the disclosure and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations and calculations, like enhancing features, determining distance values, adaptations etc., performed by one or several units or devices can be performed by any other number of units or devices. For example, the steps 101 to 106 can be performed by a single unit or by any other number of different units. The calculations or determinations and/or the control of the apparatus for segmenting an object comprising sub-objects in accordance with a method of segmenting an object comprising sub-objects can be implemented as program code means of a computer program and/or as dedicated hardware.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus (1) for segmenting an object comprising sub-objects shown in an object image (18), the apparatus comprising:
   a feature image generation unit (2) for generating a feature image (19) showing features related to intermediate regions between the sub-objects,
   a segmentation unit (3) for segmenting the sub-objects by using the object image and the feature image;
   wherein the segmentation unit comprises:
      a model providing unit for providing a model object comprising model sub-objects,
      a pre-positioning unit for pre-positioning the model object in the object image and the feature image, and
      an adaptation unit for adapting the model object to the object in the object image and in the feature image;
   wherein the adaptation unit is adapted such that a surface of a model sub-object facing another model sub-object is adapted to the feature image, and such that a surface of the model object which does not face a model sub-object is adapted to the object image.

2. The apparatus as defined in claim 1, wherein the feature image generation unit (2) is adapted for generating a feature image from the object image.

3. The apparatus as defined in claim 2, wherein the feature image generation unit (2) comprises a feature enhancing unit (7) for enhancing features related to intermediate regions between the sub-objects in the object image.

4. The apparatus as defined in claim 1, wherein the feature image generation unit (2) comprises a distance unit (8) for performing a distance transformation on the feature image, wherein the feature image comprises feature image elements, to which feature image values are assigned, wherein the distance transformation is performed in accordance with the following steps:
   determining intermediate region feature image elements of the feature image elements, wherein the intermediate region feature image elements show features related to intermediate regions between the sub-objects,
   determining a distance value for a feature image element, wherein the distance value depends on the distance between a determined intermediate region feature image element and the feature image element for which a distance value is to be determined,
   replacing the feature image value, which is assigned to the feature image element for which the distance value has been determined, by the determined distance value;
   wherein the feature image used by the segmentation unit is the distance transformed feature image.

5. The apparatus as defined in claim 1, wherein
   the model providing unit (9) is adapted for providing a surface object model (20) and a volume object model (21),
   the pre-positioning unit (10) is adapted for determining a transformation for registering the volume object model (21) onto at least one of the object image (18) and the feature image and for applying the determined transformation to the surface object model for pre-positioning the surface object model, and
   the adaptation unit (11) is adapted for adapting the surface object model to the object in the object image and in the feature image.

6. The apparatus as defined in claim 5, wherein the volume object model (21) comprises an inner structure and wherein the pre-positioning unit (10) is adapted for neglecting the inner structure of the volume object model.

7. The apparatus as defined in claim 1, wherein the object comprises, besides the sub-objects, a structure of elements, wherein
   the model providing unit (9) is adapted for providing a model (22) of the structure of elements, and
   the pre-positioning unit (10) is adapted for using a relationship between the model of the structure of elements and the model object for registering the object model by registering the model of the structure elements onto at least one of the object image and the feature image and further registering the object model, based on the registered model of the structure of elements and the relationship between the model of the structure of elements and the model object.

8. The apparatus as defined in claim 1, wherein the model object comprises a closed outer surface, which separates the model object from what is outside the model object, and at least one inner surface, which is located inside the model object, for separating the model sub-objects from each other.

9. The apparatus as defined in claim 1, wherein the model providing unit (9) is adapted for providing the model object comprising the model sub-objects by performing the following steps:
   providing several object images comprising object image elements,
   segmenting the sub-objects in the several object images,
   registering the several object images comprising the segmented sub-objects onto each other,
   fuzzying the segmented sub-objects in the several registered object images such that fuzzy values are assigned to the object image elements of the several registered object images for each segmented sub-object, wherein for each segmented sub-object a fuzzy value is assigned to an object image element of the registered object images, wherein the fuzzy value depends on the probability that the object image element of the respective registered object image belongs to the respective segmented sub-model,
   averaging the fuzzy values assigned to corresponding object image elements of the several registered object images for each segmented sub-object such that for a group of corresponding object image elements of the several registered object images an average fuzzy value is generated,
   assigning a group of corresponding object image elements of the several registered object images to a segmented sub-object in dependence on the average fuzzy value assigned to this group for the respective segmented sub-object.

10. A method of segmenting an object comprising sub-objects shown in an object image (18), the method comprising the following steps:

generating a feature image (19) showing features related to intermediate regions between the sub-objects by means of a feature image generation unit (2), segmenting the sub-objects, using the object image and the feature image, by means of a segmentation unit (3);

wherein segmenting the sub-objects comprises:

providing a model object comprising model sub-objects, pre-positioning the model object in the object image and the feature image, and adapting the model object to the object in the object image and in the feature image;

wherein adapting the model object is performed such that a surface of a model sub-object facing another model sub-object is adapted to the feature image, and such that a surface of the model object which does not face a model sub-object is adapted to the object image.

11. A nontransitory computer-readable medium having embodied thereon a computer program for segmenting an object comprising sub-objects shown in an object image (18), the computer program comprising program code means for, when the computer program is run on a computer, carrying out the steps of a method of segmenting an object comprising sub-objects shown in an object image, the method comprising the following steps:

generating a feature image showing features related to intermediate regions between the sub-objects by means of a feature image generation unit, segmenting the sub-objects, using the object image and the feature image, by means of a segmentation unit;

wherein segmenting the sub-objects comprises:

providing a model object comprising model sub-objects, pre-positioning the model object in the object image and the feature image, and adapting the model object to the object in the object image and in the feature image;

wherein adapting the model object is performed such that a surface of a model sub-object facing another model sub-object is adapted to the feature image, and such that a surface of the model object which does not face a model sub-object is adapted to the object image.

\* \* \* \* \*